United States Patent Office 3,465,237
Patented Sept. 2, 1969

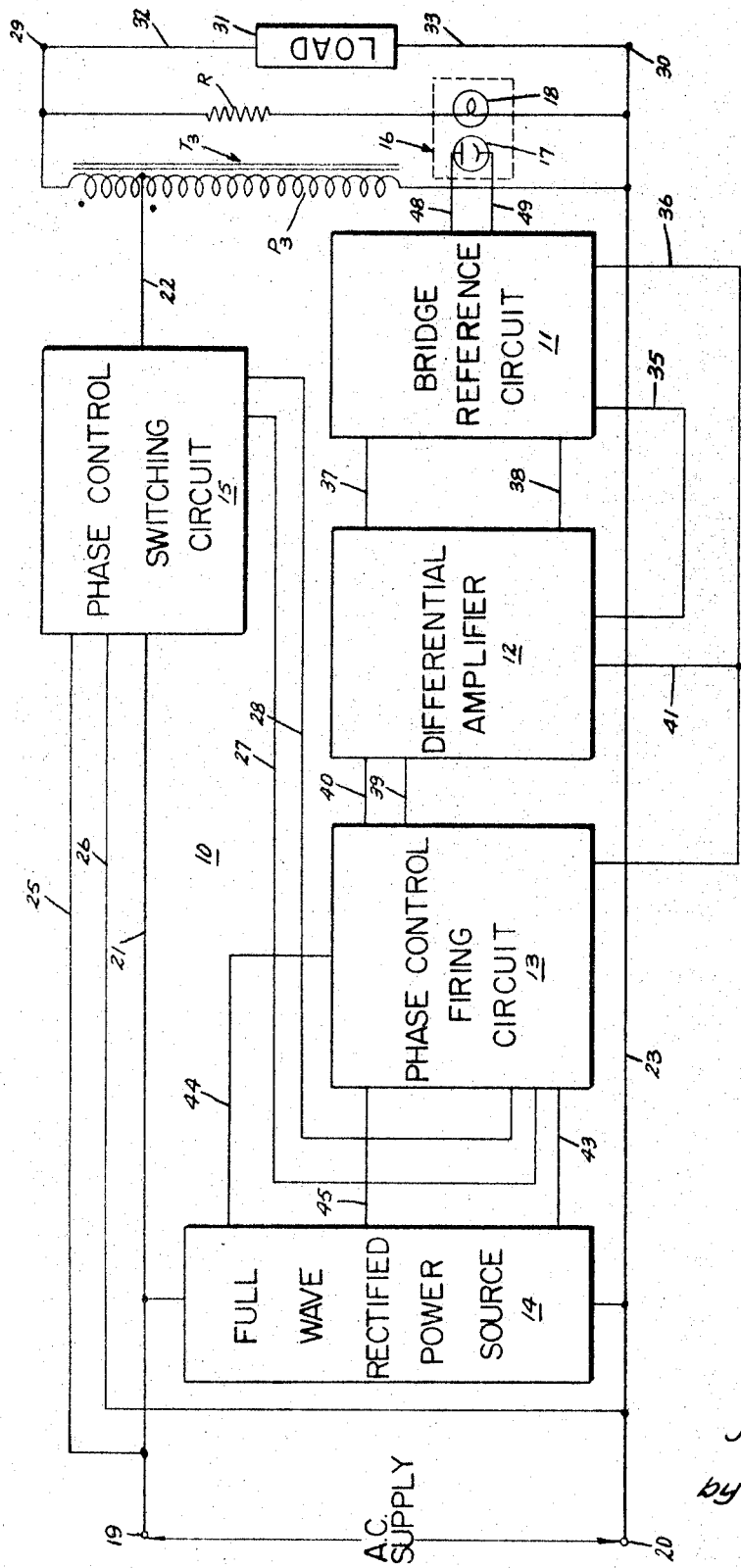

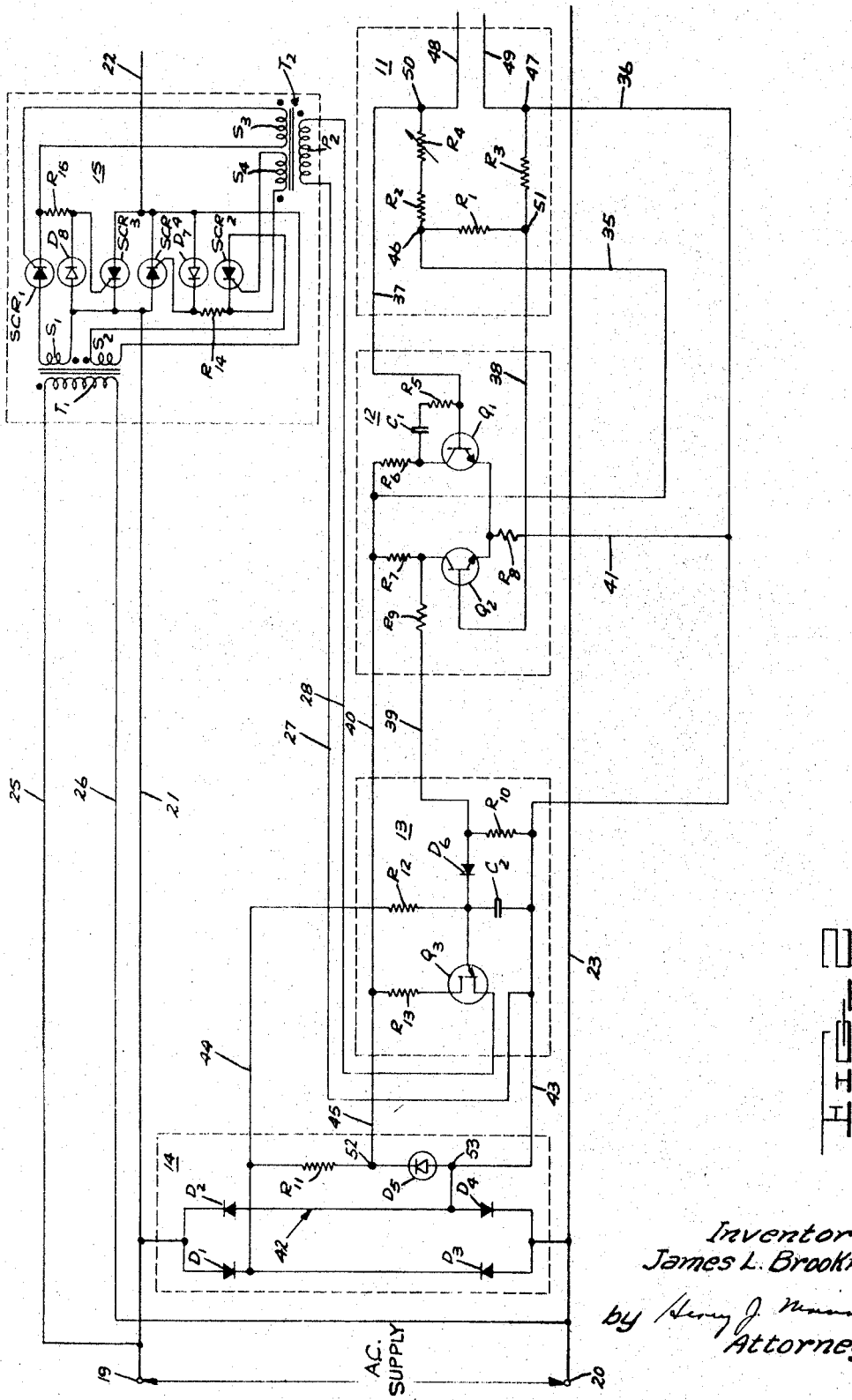

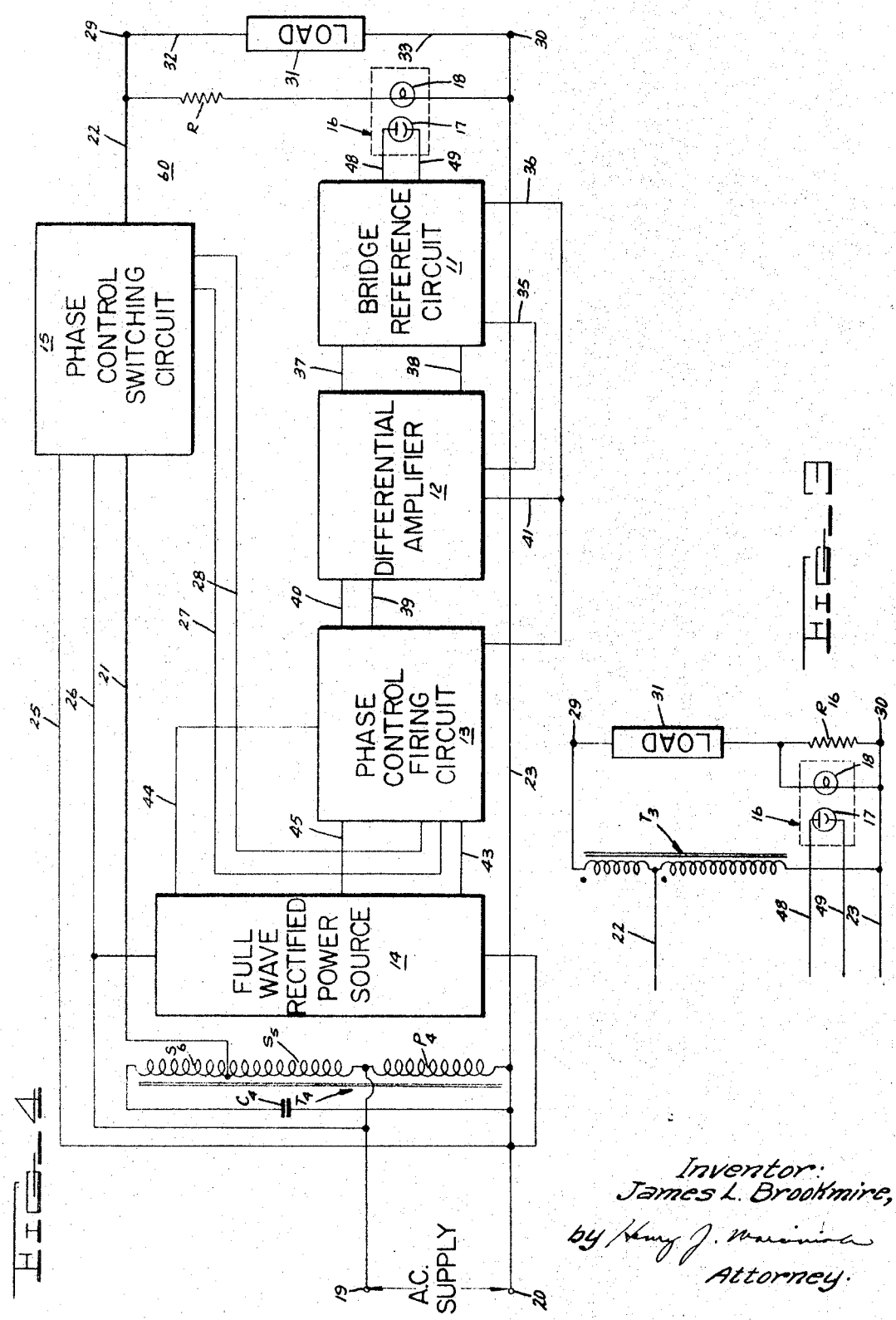

3,465,237
ALTERNATING CURRENT REGULATING APPARATUS WITH CLOSED-LOOP FEEDBACK CONTROL
James L. Brookmire, Marcellus, N.Y., assignor to General Electric Company, a corporation of New York
Filed Jan. 5, 1967, Ser. No. 607,420
Int. Cl. G05f 1/40, 1/60; H02m 3/08
U.S. Cl. 323—21                                  7 Claims

ABSTRACT OF THE DISCLOSURE

Apparatus for regulating parameters, such as load voltage and current, using a closed feedback control loop in conjunction with a phase controlled transformer. The closed feedback control loop includes a signal reference circuit that produces at its output terminals a signal corresponding to the difference between an input signal proportional to the actual magnitude of the electrical parameter regulated and a preselected reference signal. This output signal is magnified by a differential amplifier coupled to a phase control firing circuit that fires a bilateral semiconductor switch in response to variations in the difference between the magnitudes of the input signal and preselected reference signal to regulate the electrical parameter. A single rectified power source is utilized to energize the phase control firing circuit, the differential amplifier and the signal reference circuit.

---

The present invention relates to alternating current regulating apparatus, such as voltage regulators, and more particularly to regulators that utilize a closed-loop feedback control system characterized by a high gain that can be readily adjusted to control an electrical parameter in the load circuit at a preselected level and that do not require isolated power supplies for the components in the feedback control loop.

Alternating current regulating apparatus may be used in many power applications, such as for supplying a regulated voltage to a lamp load, controlling the speed of a motor, controlling the heat in a chemical or industrial process, and for other applications where a stabilized load voltage or current is required. In many applications it is particularly desirable that the speed of response and accuracy of regulation be achieved over a wide range of input voltage variations. It is always desirable to provide a regulating apparatus that can be readily adjusted to supply the desired level of current or voltage and that can be economically manufactured.

Accordingly, it is a general object of the present invention to provide an improved alternating current regulating apparatus.

More specifically, it is an object of the present invention to provide an improved alternating current regulating apparatus characterized by a fast response and accurate regulating characteristics that can be economically manufactured.

Another object of the present invention is to provide an improved alternating current regulating apparatus employing a closed-loop feedback control system that does not require separate direct current power supplies for components in the feedback loop.

In accordance with one form of the invention I have provided an improved regulating apparatus that includes a transformer with a primary circuit for connection with an alternating current supply and a secondary circuit for connection with a load. A semiconductor switching means is connected in either the primary or the secondary circuit for controlling the point in the alternating cycle at which the alternating current is applied therein. Also, the regulating apparatus includes a signal reference circuit for providing an output signal corresponding to the difference between an input signal and a preselected reference signal. A feedback circuit is coupled to the signal reference circuit to provide an input signal corresponding to the actual magnitude of the electrical parameter of the secondary circuit to be regulated. The output signal of the signal reference means is supplied to a differential amplifier, and the differential amplifier provides an output signal that represents the difference in magnitudes between the input signal and the preselected reference signal. A phase control firing circuit means is coupled with the semiconductor switching means and the differential amplifier to control the point in the alternating current cycle at which the semiconductor switching means is triggered in response to variations in the difference between the input signal and the preselected reference signal thereby to maintain the magnitude of the parameter regulated in the secondary circuit at a substantially constant level.

In an important aspect of the invention, a single full wave rectified power source is coupled with the phase control firing circuit, the differential amplifier and the signal reference circuit.

The subject matter which I regard as my invention is set forth in the appended claims. The invention itself, however, together with further objects and advantages thereof may be better understood by reference to the following description, taken in conjunction with the accompanying drawings, in which:

FIGURE 1 is a circuit diagram of one form of my invention with certain components of the improved regulating apparatus being shown schematically and others in block diagram form;

FIGURE 2 is a schematic circuit diagram of the components shown in block diagram form in FIGURE 1;

FIGURE 3 illustrates the secondary circuit of FIGURE 1 modified to show the connections of the light emission element and photoelectric cell of the feedback circuit for applications where regulation of the current is desired; and FIGURE 4 illustrates a modification of the improved regulating apparatus shown in FIGURE 1 wherein the phase control switching circuit is employed in the secondary circuit of a transformer to maintain the RMS (root mean square) load voltage at a substantially constant level.

Referring more specifically now to FIGURE 1, I have illustrated therein one form of my improved regulating apparatus, which is generally identified by reference numeral 10. The improved regulating apparatus 10 includes a transformer $T_3$, a bridge reference circuit 11, a differential amplifier 12, a phase control firing circuit 13, a full wave rectified power source 14, a phase control switching circuit 15, and a feedback circuit comprised of a resistor R and a light sealed unit 16 containing a photoelectric cell 17 and light emitting element 18.

Input terminals 19, 20 of the improved voltage regulating apparatus 10 are adapted for connection to a suitable alternating current supply which in the illustrated embodiment of the invention was a 220 volt, 60 cycle commercial power supply. It will be seen that the primary winding $P_3$ of transformer $T_3$ and the phase control switching circuit 15 are connected across the input terminals 19, 20 by means of connections 21, 22 and 23. This circuit arrangement with phase control switching circuit 15 in the primary circuit of transformer $T_3$ provides the advantage that the switching elements of the phase control switching circuit 15 are subjected to a voltage that is considerably less than the load voltage and permits lower cost controlled rectifiers to be employed.

Continuing further with the description of the circuit connections of the components of the voltage regulating apparatus 15, it will be seen in the schematic circuit diagram for the phase control switching circuit 15 as shown in FIGURE 2 that a pair of pilot silicon controlled rectifiers SCR₁ and SCR₂ are used to drive a pair of back-to-back connected main silicon controlled rectifiers SCR₃ and SCR₄. The pilot controlled rectifiers SCR₁ and SCR₂ are in a circuit loop energized by secondary windings S₁ and S₂ of transformer T₁ connected by leads 25 and 26 across the alternating current supply. The phase control switching circuit also includes resistors $R_{14}$, $R_{15}$ and Zener diodes $D_7$ and $D_8$. It will be appreciated that in applications where the phase control firing circuit 13 directly drives the main controlled rectifiers SCR₃ and SCR₄, the transformer T, the pilot controlled rectifiers SCR₁, SCR₂, resistors $R_{14}$, $R_{15}$, the Zener diodes $D_7$ and $D_8$ and the respective circuit connections would not be required. The phase control switching circuit 15 is coupled with the phase control firing circuit 13 by means of leads 27, 28 and a pulse transformer T₂ having a primary winding P₂ and a pair of secondary windings S₃ and S₄.

The output voltage of the transformer T₃ is applied to a pair of output terminals 29 and 30 for energizing a load 31 through leads 32 and 33. Also connected across output terminals 29, 30 is a feedback circuit or network consisting of the serially connected resistor R and the light emitting element 18, which in the illustrated circuit was an incandescent lamp. It will be understood that the intensity of the light emitted by the light emitting element 18 will vary proportionally with the root mean square value of the voltage across output terminals 29, 30.

In the illustrated exemplification of the invention, light emitting element 18 is located in a sealed unit 16 and is disposed adjacent to a photoelectric cell 17 which is connected by leads 48, 49 in one of the resistance bridge arms of the bridge reference circuit 11. The light from the element 18 impinging on the photoelectric cell 17 will cause the resistance of the photoelectric cell 17 to vary inversely with the intensity of the light emitted by element 18 and thereby provides a signal corresponding to the true magnitude of the electrical parameter, in this case the RMS magnitude of the load voltage, to be held substantially at a constant level by the regulating apparatus 10.

Although in the illustrated embodiments of my invention a light emitting element 18 and a photoelectric cell 17 were used to provide a signal corresponding to the actual magnitude of the electrical parameter to be stabilized in the load circuit, it will be appreciated that other devices such as photodiodes or phototransistors may be employed in the practice of the present invention.

The purpose of the bridge reference circuit 11 in the illustrated exemplification of my invention is to provide an error voltage signal that corresponds to the difference between the actual root mean square value of the load voltage and a preselected reference signal. As will be best seen in FIGURE 2, the bridge reference circuit 11 is energized from the full wave rectified power source 14 by means of leads 35, 36 and is coupled with the input of the differential amplifier 12 by means of leads 37, 38. The amplified output signal of the differential amplifier 12 is supplied to the phase control firing circuit 13 by lead 39. The differential amplifier 12 is energized from full wave rectified power source 14 by means of leads 40 and 41 through the connections that also couple the phase control firing circuit 13 with the power source 14. It will be seen in FIGURE 2 that the phase control firing circuit 13 is connected to the negative terminal of full wave bridge 42 by lead 43 and to the positive terminal of the full wave bridge 42 by lead 44 and to the clipped full wave output of the power source 14 by lead 45.

Light from element 18 impinging on the photoelectric cell 17 causes the resistance of the photoelectric cell 17 connected in the bridge reference circuit 11 to change in response to the root mean square value of the load voltage. An error or output signal is produced at the bridge output terminals 50, 51 of the bridge reference circuit 11 that corresponds to the difference in the magnitudes of the feedback signal and the preselected reference or comparison signal of the bridge reference circuit 11. This error signal is amplified by the differential amplifier 12 and the firing circuit 13 to produce pulses for phase controlling the pilot silicon controlled rectifiers SCR₁ and SCR₂ which in turn fire the main silicon controlled rectifiers SCR₃ and SCR₄ in the power circuit.

Having more specific reference now to the circuit diagram illustrated in FIGURE 2, I will now more fully describe the individual components of the regulating apparatus 10 shown in block form in FIGURE 1. An important feature of the invention resides in the circuit arrangement wherein the bridge reference circuit 11, the differential amplifier 12 and the phase control firing circuit 13 are energized from the same full wave rectified power source 14. It will be seen that the full wave rectified power source 14 includes four rectifiers $D_1$, $D_2$, $D_3$, and $D_4$ that form the full wave bridge 42. A network consisting of Zener diode $D_5$ and resistor $R_{11}$ provides a clipped full wave rectified output at bridge terminals 52, 53 for energizing the components of the closed feedback control loop. The clipped full wave rectified voltage is supplied at terminals 46, 47 of the bridge reference circuit 11 by leads 45, 40, 35 and 43; 36; across the emitter-collector circuits of transistors Q₁ and Q₂ by leads 45, 40 and 43, 41; and across unijunction transistor Q₃ by leads 45 and 43, 27 and 28.

The bridge reference circuit 11 comprising resistors $R_1$, $R_2$, $R_3$, $R_4$, and the photoelectric cell 17 provides a fixed reference with essentially only one variable, the resistance of the photoelectric cell 17. The magnitude of desired load voltage to be regulated is initially preselected by setting the potentiometer or variable resistor $R_4$ to provide the desired magnitude of the reference signal. This initial setting of the potentiometer $R_4$ determines the level at which the load voltage will be regulated. The following equation may be utilized in the exemplified circuit for computing the turns ratio of transformer T₃ to provide for optimum regulation of the circuit:

$$\frac{V_p}{V_s} = 0.75 \frac{V_{line}}{V_{load}}$$

where:

$V_p$ = primary voltage of transformer T₃,
$V_s$ = secondary voltage of transformer T₃,
$V_{line}$ = nominal RMS voltage across input terminals 19, 20, and
$V_{load}$ = desired RMS load voltage at output terminals 29, 30.

The error signal produced by the reference bridge circuit 11 across terminals 50, 51 is supplied to the differential amplifier 12. The differential amplifier 12 used in the illustrated embodiment of the invention includes NPN transistors Q₁, Q₂, resistors $R_5$, $R_6$, $R_7$, $R_8$, and $R_9$ and capacitor $C_1$. The serially connected capacitor $C_1$ and resistor $R_5$ connected across the collector and base of the transistor Q₁ comprise a lag-lead stabilization network for the closed loop.

As will be seen in FIGURE 2, the phase control firing circuit 13 includes unijunction transistor Q₃, resistors $R_{10}$, $R_{12}$, $R_{13}$, diode $D_6$, and capacitor $C_2$. The differential amplifier 12 is coupled through diode $D_6$ with the firing circuit 13, and the signal from the amplifier 12 controls the point in the half cycle at which the voltage on capacitor $C_2$ reaches the emitter peak point voltage of the unijunction transistor Q₃. Thus, the amplifier 12 in conjunction with the phase control circuit 13 controls the firing angle at which the pilot controlled rectifiers SCR₁ and SCR₂ are fired to trigger the main controlled rectifiers SCR₃ and SCR₄ into conduction. The controlled rectifier, SCR₁ or SCR₂, that has the positive anode voltage during a specific half cycle is triggered and provides the signal to trigger its respective main controlled rectifier. The low voltage AC supply for the pilot controlled rectifiers $SCR_1$ and $SCR_2$ is obtained from the secondary windings $S_1$ and $S_2$ of the transformer $T_1$. Zener diodes $D_7$ and $D_8$ in conjunction with resistors $R_{14}$ and $R_{15}$ clip the gate voltage to prevent excessive power dissipation in the gates of the main controlled rectifiers $SCR_3$ and $SCR_4$.

Let us assume that the potentiometer $R_4$ of the bridge reference circuit 11 has been set to obtain a desired RMS load voltage for the nominal input line voltage. Further, let us assume that the input line voltage increases to a new fixed value. This will cause the light emission of element 18 to increase and thereby cause the resistance of the photoelectric cell 17 to decrease. The output of the bridge reference circuit at the base of transistor $Q_1$ will become negative in respect to its fixed reference value. This output signal is immediately amplified by the differential amplifier 12 with no polarity change at the output of amplifier 12. The triggering of the unijunction transistor $Q_3$ is delayed to cause the main controlled rectifiers $SCR_3$ and $SCR_4$ to conduct later in a cycle. Accordingly, less voltage is applied to the load 31 to reduce the difference between the actual and desired RMS load voltage rapidly within milliseconds until a steady state condition is attained.

By way of further exemplification, the regulating apparatus 10 shown in FIGURES 1 and 2 was constructed and reduced to practice. The following specifications of components used in this exemplification of the invention are given by way of illustration as follows (all resistors except as specifically noted are 10% and ½ watt):

The components appear in the table below:

| | Specification |
|---|---|
| Filament transformer $T_1$ | 220 volt RMS primary, 12 volt RMS secondary, 100 milliamperes RMS rated secondary current. |
| Pulse transformer $T_2$ | Aladdin Part No. 90–2398, turns ratio 1:1:1. |
| Load transformer $T_3$ | Turns ratio 1:1.82, 4 kilovolt amperes. |
| Diodes $D_1$, $D_2$, $D_3$, $D_4$ | General Electric A13D or A14D. |
| Zener diode $D_5$ | General Electric Z4XL22. |
| Diode $D_6$ | General Electric A13F or A14F. |
| Zener diodes $D_7$, $D_8$ | General Electric 16L1423. |
| Transistors $Q_1$, $Q_2$ | General Electric 2N2925. |
| Unijunction Transistor $Q_3$ | General Electric 2N2646. |
| Pilot controlled rectifiers $SCR_1$, $SCR_2$ | General Electric C6U or C106Y. |
| Main controlled rectifiers $SCR_3$, $SCR_4$ | General Electric C135E or C35E. |
| Capacitor $C_1$ | Miniature tubular wet slug capacitor, 10 microfarads, 25 volt DC, General Electric 62F204. |
| Capacitor $C_2$ | 0.22µf, 50 volts DC, ±10%, General Electric 75F3R5–244A. |
| Resistor R | 9,000 ohms, ±5%, 14 watts. |
| Resistor $R_1$ | 22,000 ohms. |
| Resistor $R_2$ | 2,200 ohms. |
| Resistor $R_3$ | 18,000 ohms. |
| Resistor $R_4$ | 10,000 ohms, multi-turn trim potentiometer. |
| Resistor $R_5$ | 10,000 ohms. |
| Resistor $R_6$ | 2,200 ohms. |
| Resistor $R_7$ | 2,200 ohms. |
| Resistor $R_8$ | 2,200 ohms. |
| Resistor $R_9$ | 5,600 ohms. |
| Resistor $R_{10}$ | 47,000 ohms. |
| Resistor $R_{11}$ | 8,200 ohms, 10 watt. |
| Resistor $R_{12}$ | 1.5 megohms. |
| Resistor $R_{13}$ | 1,000 ohms. |
| Resistor $R_{14}$ | 220 ohms. |
| Lamp 18 and photoelectric cell | Integral hermetically sealed unit General Electric PL5B1. |

In the above described specific exemplification of the improved regulating apparatus 10, the potentiometer $R_4$ in the bridge reference circuit 11 was adjusted to provide 165 volts RMS across primary winding $P_3$ of the load transformer $T_3$ to provide a preselected load voltage across the output terminals 29, 30 of 300 volts RMS. At this initial circuit setting, the value for the resistance of resistor R was selected to provide a voltage across element 18 of approximately 1.95 volts RMS. For the preselected load voltage of 300, this resistive value was found to be 9,000 ohms.

Table I below shows the regulation obtained by the improved apparatus 10 for a 3 kilowatt resistive load for the preselected RMS load voltage of 300 volts and a nominal input line voltage of 220 volts RMS, 60 cycles per second. The response time for a step change in input was estimated to be less than 100 milliseconds.

TABLE I

| Input Line Voltage | True RMS Load Voltage | Load Voltage Change |
|---|---|---|
| 220 volts RMS (nominal). | 300 volts (nominal) | |
| 190 volts RMS | Negligible Change | Less than −0.1%. |
| 250 volts RMS | Approximately 298.5 volts | Less than −0.6%. |

From the foregoing description, it will be apparent that an improved regulating apparatus is provided with a closed-loop feedback control for regulating electrical parameters, such as voltage, current and power. Inherent advantages in the improved regulating apparatus are accuracy of regulation, speed of response, and and relatively low cost. With the improved arrangement it is possible to eliminate the need for separate power supplies for the various circuits in the closed feedback loop.

In FIGURE 3 I have illustrated how the voltage regulating apparatus of FIGURE 1 can be converted to a regulator for controlling the root mean square load current. To effect this type of conversion, a low resistance current sensing resistor $R_{16}$ is connected in series with the load 31 and the light emitting element 18 is connected in parallel with resistor $R_{16}$. In this embodiment of the invention, the resistance of sensing resistor $R_{16}$ was selected so that the true root mean square voltage drop across resistor $R_{16}$ was approximately 1.95 volts (with the lamp connected for the nominal load current desired).

The operation of the current regulating apparatus is essentially similar to the voltage regulating apparatus of FIGURES 1 and 2 except that the feedback signal supplied into the closed control loop corresponds to the actual root mean square load current. The voltage in the primary circuit of the load transformer $T_3$ is phase controlled to correct for any difference between the actual RMS load current and the preselected stabilized current level.

Having specific reference now to FIGURE 4 of the drawings, I have illustrated therein another embodiment of my improved regulating apparatus with the phase control switching circuit 15 connected in the secondary circuit of a load transformer $T_4$. The closed loop of the control arrangement shown in FIGURE 4 is essentially the same as used in the regulating apparatus illustrated in FIGURES 1 and 2. Therefore, the corresponding components and circuit interconnections are identified in FIGURE 4 with the same reference numerals.

In the voltage regulating apparatus 60 of FIGURE 4, the main controlled rectifiers of the phase control switching circuit 15 are connected in series with the load 31. The transformer $T_4$ includes a primary winding $P_4$, a secondary winding $S_5$ and an extension winding $S_6$. The extension winding $S_6$ is provided to permit a higher voltage power factor capacitor $C_4$ to be used.

The primary winding $P_4$ of the transformer $T_4$ is connected across a suitable alternating current supply, such as a 120 volt supply. A load 31, such as an electric discharge lamp, is connected across the output terminals 29, 30.

In order to provide a stabilized voltage for operation of the load 31, the bridge reference circuit 11 is adjusted to provide a preselected root mean square operating voltage. When the actual voltage across the load 31 during operation deviates from the desired root mean square value, the intensity of the light emitting from element 18 will proportionally vary and thereby produce a change in the resistance of the photoelectric cell 17 of the bridge reference circuit 11. As was previously described in connection with the voltage regulating apparatus 10 shown in FIGURES 1 and 2, the error signal at the output of the bridge reference circuit 11 is then amplified by the differential amplifier 12 and phase control firing circuit 13 to change the firing angle of the main controlled rectifiers to correct the root mean square voltage applied to load 31. In this regulating apparatus 60 as well as in the regulating apparatus 10 shown in FIGURES 1 and 2, the phase relationship of the closed loop is such that a finite error voltage signal is continuously produced.

Although in the exemplifications of the invention, the regulating apparatus is adapted for controlling voltage and current, it will be apparent that the improved arrangement can be adapted for the regulation of other electrical parameters such as power. Further, it will be apparent that although silicon controlled rectifiers have been employed in the illustrated embodiments of the invention, other semiconductor switching devices may be used to practice my invention.

What I claim as new and desire to secure by Letters Patent of the United States is:

1. An apparatus for supplying a regulated alternating output, said apparatus comprising a transformer having a primary circuit for connection with an alternating current supply and a secondary circuit for connection with a load, semiconductor switching means connected in one of said aforementioned circuits and switchable from a high impedance to a low impedance condition for controlling the point in the alternating cycle at which alternating current is applied in said one of said circuits, a signal reference means for providing at its output terminals an output signal corresponding to the difference between an input signal and a preselected reference signal, feedback means for supplying to said signal reference means an input signal corresponding to the actual magnitude of an electrical parameter of the secondary circuit, a differential amplifier, circuit means coupling said output terminals of said signal reference means with said differential amplifier for amplifying the difference between the input signal and the preselected reference signal, phase control firing circuit means coupled with said semiconductor switching means and the differential amplifier for controlling the point in the alternating current cycle at which said semiconductor switching means is triggered from the high impedance condition to the low impedance condition in response to variations in said difference between the input signal and the preselected reference signal thereby to maintain a desired magnitude of said parameter in the secondary circuit, and a rectified power coupled with said phase control firing circuit, said differential amplifier and said signal reference means to supply a rectified current thereto.

2. The apparatus set forth in claim 1 wherein the semiconductor switching means is connected in the primary circuit of the transformer.

3. The apparatus set forth in claim 1 wherein said semiconductor switching means is connected in the secondary circuit of said transformer.

4. The apparatus set forth in claim 1 wherein said feedback means includes light-sealed enclosure containing an incandescent lamp and a photoelectric element.

5. The apparatus set forth in claim 1 wherein said feedback means supplies a signal corresponding to the actual root mean square value of the parameter of the secondary circuit.

6. An apparatus for supplying a regulated alternating output voltage, said apparatus comprising a transformer having a primary circuit for connection with an alternating current supply and a secondary circuit for connection with a load, a bilateral semiconductor switching means connected in one of said circuits and switchable from a high impedance to a low impedance condition for controlling the point in the alternating cycle at which the alternating current is applied to said one of said circuits, a voltage reference means for comparing an input signal with a preselected comparison signal, feedback means for supplying to said voltage reference means an input signal corresponding to the actual output voltage, a differential amplifier, a firing circuit means coupled with said bilateral semiconductor switching means, said differential amplifier being coupled with said voltage reference means and said firing circuit means to cause said firing circuit means to switch said semiconductor switching means from the high impedance condition to the low impedance condition at an advanced or retarded point in each half cycle in response to variations in the difference between said input signal and said preselection comparison signal, and a full wave rectified power supply means coupled with said voltage reference means, said differential amplifier and said firing circuit means to supply a full wave rectified current thereto.

7. An apparatus for supplying a regulated output current, said apparatus comprising: a transformer having a primary circuit for connection with an alternating current supply and a secondary circuit for connection with a load, semiconductor switching means connected in said secondary circuit and switchable from a high impedance to a low impedance condition for controlling the point in the alternating cycle at which the alternating current is applied to said secondary circuit, a signal reference means for producing at its output terminals an output signal representing the difference between an input signal and a preselected comparison signal, a feedback means for supplying to said signal reference means an input signal corresponding to the root mean square value of the alternating output current, a differential amplifier, a phase control firing circuit coupled with said semiconductor switching means and the differential amplifier for controlling the point in the alternating current cycle at which the semiconductor switching means is switched from the high impedance condition to the low impedance condition in response to said difference between the input signal and preselected comparison signal, and a rectified power source coupled with said phase control firing circuit, said differential amplifier and signal reference means to supply a rectified current thereto.

References Cited

UNITED STATES PATENTS

| 2,779,897 | 1/1957 | Ellis | 323—21 X |
|---|---|---|---|
| 3,243,689 | 3/1966 | Perrins. | |
| 3,263,157 | 7/1966 | Klein | 323—43.5 X |
| 3,341,769 | 9/1967 | Grant. | |
| 3,370,223 | 2/1968 | Senetcen. | |
| 3,389,328 | 6/1968 | Janson | 323—19 |

JOHN F. COUCH, Primary Examiner

A. D. PELLINEN, Assistant Examiner

U.S. Cl. X.R.

323—22, 24

UNITED STATES PATENT OFFICE
CERTIFICATE OF CORRECTION

Patent No. 3,465,237　　　　　Dated September 2, 1969

Inventor(s) James L. Brookmire

It is certified that error appears in the above-identified patent and that said Letters Patent are hereby corrected as shown below:

Column 7, line 66, after "power" insert -- source --.

Column 8, line 29, for "preselection" read -- preselected --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents